Aug. 20, 1957 R. I. MASON 2,803,068
SWIMMER'S UNDERWATER COMPASS
Filed March 8, 1956
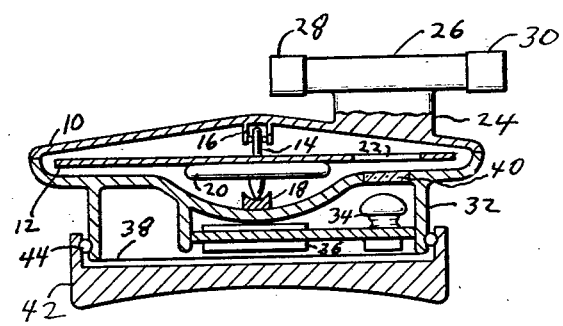
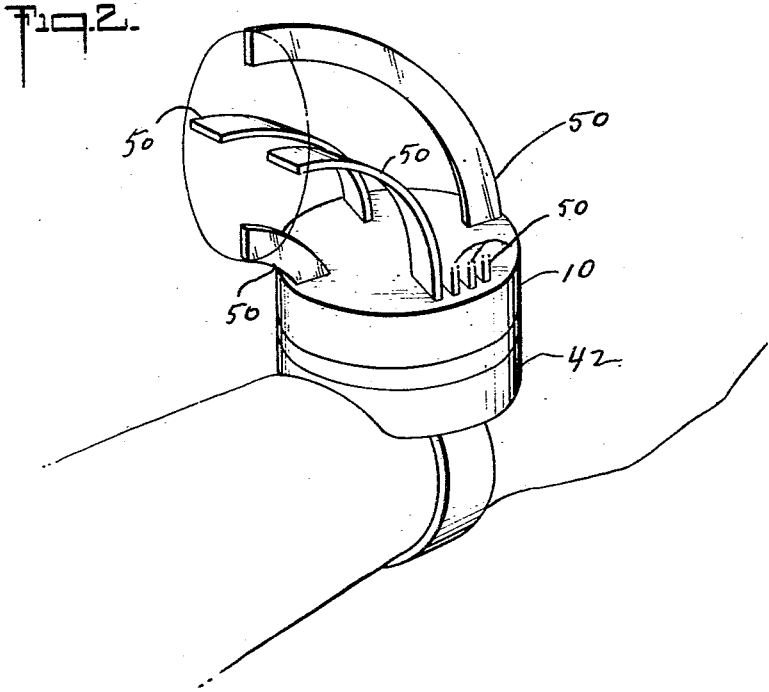
INVENTOR
RUSSELL I. MASON

2,803,068
Patented Aug. 20, 1957

2,803,068
SWIMMER'S UNDERWATER COMPASS

Russell I. Mason, Mystic, Conn.

Application March 8, 1956, Serial No. 570,398

17 Claims. (Cl. 33—223)

(Granted under Title 35, U. S. Code (1952), sec. 266)

The invention described herein may be manufactured and used by or for the Government of the United States of America for governmental purposes without the payment of any royalties thereon or therefor.

This invention relates to a compass and, more particularly, to a compass adapted for underwater use.

The use of a compass by an underwater swimmer who employs air or oxygen bottles is well known. At present, a swimmer wears a wrist-mounted simple compass. This compass is unsuitable for this application in that it is not completely waterproof; it is difficult to read, since it has no illumination outside of its own luminescence; it is fragile; and slight motion causes erratic oscillations of the needle. In addition, the fact that this presently used compass is difficult to read causes inaccuracies. This is so because an underwater swimmer must bring it close to his eyes and in so doing he brings it close to his steel air or oxygen bottles, which deflects the needle.

It is therefore an object of this invention to provide a compass which can be read by an underwater swimmer at arms length.

It is a further object of this invention to provide a completely waterproof compass.

It is a still further object of this invention to provide a rugged compass.

It is a still further object of this invention to provide a compass having sufficient damping to prevent erratic oscillations of its needle.

Other objects and many of the attendant advantages of this invention will be readily appreciated as the same becomes better understood by reference to the following detailed description when considered in connection with the accompanying drawing wherein:

Fig. 1 is a cross-sectional view, partly in elevation, of a preferred embodiment of a compass employing the principles of this invention, and Fig. 2 is an illustration of another embodiment of a compass which also employs the principles of this invention.

Referring now to Fig. 1, there is shown a casing 10 composed of two sealed together pieces of a transparent plastic such as Lucite. Located within the volume enclosed by casing 10 is compass card 12, which is pivotally mounted on casing 10 by means of pin 14, ring bearing 16 and cone bearing 18. The ring bearing is shown as being in the form of a toroid. There is substantially line contact between pin 14 and ring bearing 16 permitting relative displacement longitudinally and rotationally. With a ring bearing, there will be no bearing seizure of pin 14 even after considerable compression of casing 10 underwater. Fixedly attached to compass card 12 is bar magnet 20. Bar magnet 20 may be dispensed with by making compass card 12 itself out of magnetized metal. A radial slit 22, cut in compass card 12, has a fixed bearing relative to the north pole of magnet 20, and, as shown, in Fig. 1 is in line with the north pole of magnet 20.

Attached to a transparent portion of casing 10, situated on one side of compass card 12, is stem 24, composed of a light-piping material such as Lucite. Stem 24 supports cylindrical rod 26, also composed of a light-piping material such as Lucite.

Shield sleeves 28 and 30 are placed over each end of the cylindrical surface of rod 26. The transverse section of the ends of cylinder 26 are not covered. When light is piped through rod 26, shield sleeves 28 and 30 make it possible to view the rod 26 exactly along its axis; when viewed other than axially, not only will the end of the rod be visible but also the side of the rod beyond the sleeve will also be visible. The two ends of rod 26 are differentiated from each other by the fact that shield 30 is closer to the periphery of casing 10 than is shield 28. This differentiation may be accentuated by distinctly coloring each end of rod 26 or by marking "N" and "S" on them.

An extension 32 from casing 10 supports incandescent lamp 34 and battery 36 which is electrically connected to supply power thereto. A cover or diaphragm 38 is connected to extension 32 to provide a watertight chamber for lamp 34 and battery 36. A transparent window 40 permits light emitted from lamp 34 to illuminate the other side of compass card 12. This light reaches rod 26 only when slit 22 is in line with rod 26.

Extension 32 of casing 10 is mounted for 360 degree rotation in wrist mount 42. A conventional detent arrangement 44 is provided for purposes of indexing. The detent arrangement provides for thirty-six distinct positions of casing 10 relative to wrist mount 42. The detent arrangement includes thirty-six equally spaced recesses, only two of which are shown in Fig. 1, formed in extension 32 and two or more recesses formed in wrist mount 42. A ball seats in each of the recesses in the wrist mount 42 regardless of the relative positions of housing 10 and wrist mount 42.

Except for the transparent portion of casing 10 to which stem 24 is attached and transparent window 40, casing 10 is made opaque by painting or otherwise.

The enclosure in casing 10 in which compass card 12 is disposed may be filled with liquid to provide sufficient damping to prevent erratic oscillations of compass card 12.

Considering now the operation of the compass shown in Fig. 1, the swimmer wears the compass on his wrist. By extending his arm in a horizontal direction and slowly turning in the water he arrives at a direction where rod 26 lights up. This signifies that slit 22 in compass card 12 has come directly in line with rod 26 and is allowing light to pass through the slit and illuminate rod 26. This means that rod 26 is now pointing in a north-south direction. If the swimmer now rotates slowly, while at the same time turning casing 10 in mount 42, he can manage to keep the light on. He will arrive at a point where he is looking directly into the end of rod 26 and will then see only a small disk of light. At that time, he is then facing either north or south, depending whether he is looking at the end covered by shield 28 or the end covered by shield 30. It should be understood that the swimmer can, regardless of his heading, always make rod 26 light up in one azimuth position by turning either rod 26 (which turns casing 10 in mount 42) or himself. However, at only one point can he see the tiny circle of light that indicates north or south and that is when he faces north or south, because at that time he will be sighting directly into the end of the rod. When he faces in any other direction (except north and south) he sees (if he orients the casing 10 properly) the full illuminated rod 26—a horizontal bar of light.

In order for the swimmer to orient himself on another bearing, he first finds north as just described. He then rotates rod 26 the required number of degrees to the desired bearing, which is accomplished by clicking detent 44 in the proper direction the necessary number of 10 degree steps. For instance, if he wants to go east he turns compass casing 10 nine counted detent steps counterclockwise, towards west, the reciprocal of east. As soon as he starts turning, the light in rod 26 will go out. Then with his arm still extended, he starts turning his body in a clockwise direction. At some point, the light will come on again—a full bar of light—and he is then heading due east. As long as he stays on a due east course the light stays on so he literally can follow his pointing arm with its beckoning light. At any time he can stop and calibrate for north. He can also tell from the way the lighted rod 26 is pointing where north is for the rod, since rod 26, if lighted, always points north and south.

Referring now to Fig. 2 which is generally similar to Fig. 1, like reference numerals designating like parts. In Fig. 2, single rod 26 of Fig. 1 is replaced by 36 curved light-piping bars 50 spaced at 10 degree intervals around the circumference of casing 10, curved as shown with the remote ends of bars 50 terminating in a vertical plane.

In the compass shown in Fig. 2 casing 10 is fixed with respect to mount 42. Although not shown, the incandescent lamp of Fig. 2 is oriented to illuminate the entire undersurface of the compass card thereof. Casing 10 is made opaque except where bars 50 join casing 10.

The operation of the compass shown in Fig. 2 is similar to that of the compass shown in Fig. 1, except that some one bar 50 will always be lighted up. The particular bar 50 which is lighted up, however, will depend upon the orientation of the slit in the compass card which in turn depends upon the direction the swimmer is facing. When the swimmer has his arm extended and the top bar 50 is lighted the swimmer is facing north; when the bar 50 next to the top bar, in a clockwise direction relative to the swimmer, is lighted, the swimmer is facing 10° west of north, etc.

Obviously many modifications and variations of the present invention are possible in the light of the above teachings. It is therefore to be understood that within the scope of the appended claims the invention may be practiced otherwise than as specifically described.

I claim:

1. A compass adapted for underwater use; said compass comprising a casing forming a watertight enclosure, magnetic means having oppositely disposed north and south poles located within said enclosure and pivotally mounted on said casing for rotation about an axis intermediate said north and south poles, said magnetic means including an opaque planar compass card disposed concentrically about said axis, said compass card having a radial slit therein which is oriented at a fixed bearing relative to said north pole, light emitting means attached to said casing, said light emitting means being disposed on one side of said compass card to illuminate the region of said enclosure located on said one side of said compass card, light from said emitting means being transmitted to the region of said enclosure located on the other side of said compass card only through said slit, and at least one light-piping member located outside of said enclosure and fixedly attached to a transparent linear portion of said casing which bounds the region of said enclosure located on said other side of said compass card, said portion lying in a plane which includes said axis, whereby said member is illuminated only in response to said slit being oriented in said plane.

2. The compass defined in claim 1, wherein said magnetic means further includes a bar magnet fixedly attached to said compass card, said bar magnet being disposed in line with said slit.

3. The compass defined in claim 2, wherein said member includes a single cylindrical rod composed of light-piping material oriented parallel to a radius of said compass card and a stem composed of said light-piping material connecting said rod to said portion.

4. The compass defined in claim 3, including means placed only at each end portion of the cylindrical surface of said rod for preventing light from emitting therefrom.

5. The compass defined in claim 4, wherein said light-mitting means includes an incandescent lamp, a battery electrically connected to said lamp for supplying power thereto, means integral with said casing for supporting said battery and lamp outside of said enclosure in a watertight chamber, said lamp being disposed in said plane which includes said axis, and said casing including a transparent window for permitting the light from said lamp to enter said enclosure.

6. The compass defined in claim 5, where in said casing is opaque except for said transparent window and transparent portion.

7. The compass defined in claim 6, further including a second member, and means for mounting said casing in said second member for 360° rotation relative to said second member about said axis.

8. The compass defined in claim 7, wherein said means for mounting said casing in said second member includes detent means providing a predetermined number of equiangularly-spaced stops over the entire 360° through which said casing is rotatable.

9. The compass defined in claim 8, wherein said second member is substantially cylindrically recessed whereby it is adapted to be worn on the wrist of a person.

10. The compass defined in claim 1, including a plurality of light-piping members spaced at equal angles from each other and from said one light-piping member about said axis and fixedly attached in the same manner as said one light-piping member.

11. The compass defined in claim 10, wherein each of said light-piping members consists of a curved bar, the ends of said bars remote from said casing terminating in a plane parallel to said axis.

12. The compass defined in claim 11, wherein said casing is opaque except for said transparent portions.

13. The compass defined in claim 12, further including a second member, and means for mounting said casing in said second member.

14. The compass defined in claim 13, wherein said second member is substantially cylindrically recessed whereby it is adapted to be worn on the wrist of a person.

15. The compass defined in claim 1, further including a second member, and means for mounting said casing in said second member.

16. The compass defined in claim 15, wherein said second member is substantially cylindrically recessed whereby it is adapted to be worn on the wrist of a person.

17. The compass defined in claim 1, wherein said enclosure is filled with liquid.

References Cited in the file of this patent

UNITED STATES PATENTS

| 2,286,014 | Rowe | June 9, 1942 |

FOREIGN PATENTS

| 426,695 | France | May 10, 1911 |
| 117,641 | Great Britain | Aug. 1, 1918 |
| 726,061 | France | Feb. 23, 1932 |